Feb. 11, 1958   R. M. F. SHACKELFORD   2,822,562
POLISHING ATTACHMENT FOR ELECTRIC MIXERS
Filed Oct. 13, 1955   2 Sheets-Sheet 1
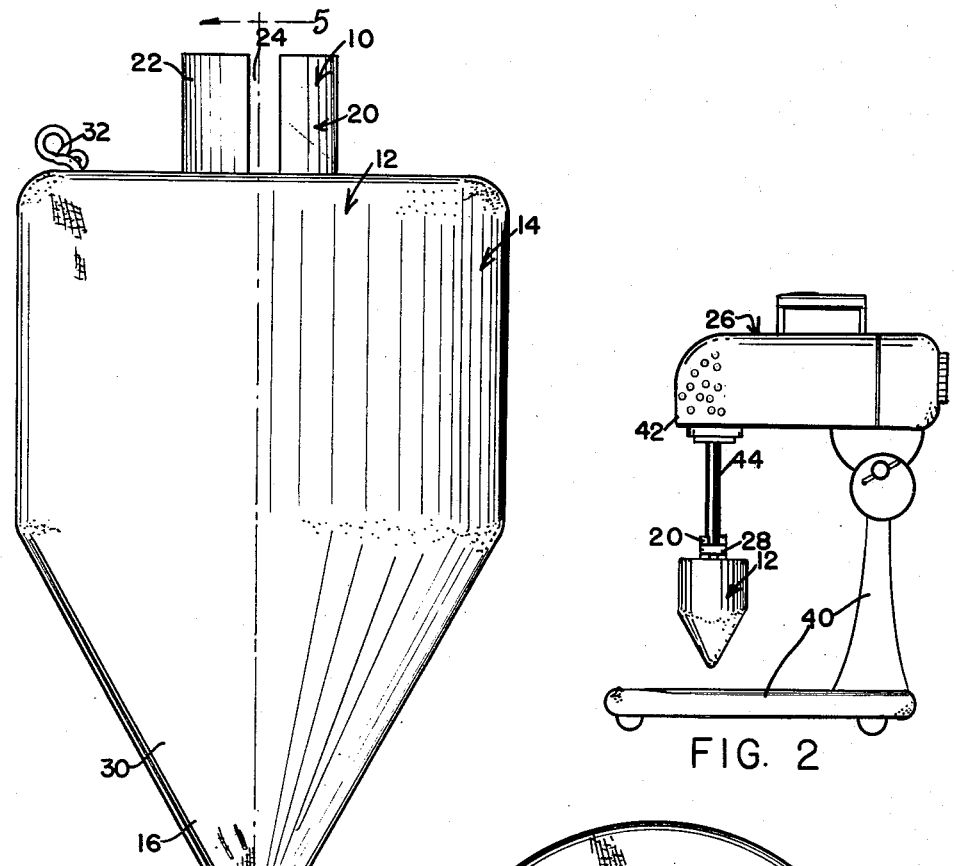
FIG. 1
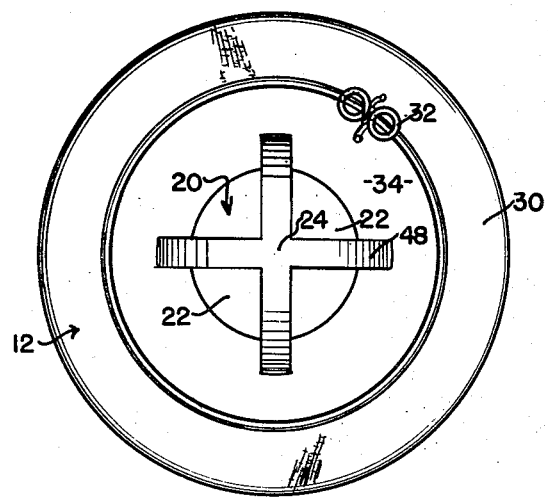
FIG. 2
FIG. 3
FIG. 4
INVENTOR.
RENÉE M.F. SHACKELFORD
BY
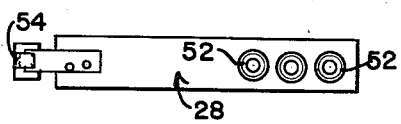
ATTORNEY Feb. 11, 1958 R. M. F. SHACKELFORD 2,822,562
POLISHING ATTACHMENT FOR ELECTRIC MIXERS
Filed Oct. 13, 1955 2 Sheets-Sheet 2

INVENTOR.
RENÉE M.F. SHACKELFORD
BY
ATTORNEY

United States Patent Office 2,822,562
Patented Feb. 11, 1958

2,822,562
POLISHING ATTACHMENT FOR ELECTRIC MIXERS

Renée M. F. Shackelford, Atlanta, Ga.

Application October 13, 1955, Serial No. 540,204

8 Claims. (Cl. 15—230)

This invention relates to a polishing attachment for electric mixers and especially to a device of that sort which can be attached on the usual beaters of virtually any of the makes and models of mixers.

Many household items are of metal and other materials which must be cleaned and polished at one time or another. All silver items tend to become tarnished and need to be thoroughly cleaned or at least touched up from time to time and desirably before each use. This cleaning, and particularly the high-luster buffing part, of such items is time consuming and tiring. Inasmuch as so many homes have a conventional electric kitchen mixer therein, a great deal of the lost time and hard work is avoided in using the present attachment which is particularly applicable on the mixers for the polishing and shining of various objects.

Generally described without regard to the intricacies of patent terminology, the present device is a tapered, resilient polishing body member with a removable cover thereon and a harder center core which is slotted in a particular manner to receive and hold the beaters of a conventional kitchen electric mixer. According to this construction, the entire polishing attachment has a sort of special socket formed internally thereof with slots exposed outwardly thereof so that the device can be fitted over and onto the mixer shaft.

The overall object of this invention is to provide an attachment for electric mixers which is especially suitable for polishing silver and the like.

An additional object of the invention is found in the novel construction whereby the device will fit over the regular mixer beaters of virtually all mixers without special attachments for each particular make and/or model of mixer.

Another object of the invention resides in the construction of the polishing body of the attachment giving it a great deal of flexibility and making it adaptable to cleaning and polishing objects of different and sometimes unusual shape without making special adjustments.

Other and further objects and advantages of my invention will be apparent from the following description taken in conjunction with the accompanying drawings, in which:

Fig. 1 is a side elevation view of my invention with its removable cover thereon.

Fig. 2 is a side elevation view of the device in place on a conventional mixer.

Fig. 3 is a top plan view of the device in Fig. 1.

Fig. 4 is a side elevation view of a flexible strap member used to secure the device of Fig. 1 when in position on a mixer.

Figure 5:
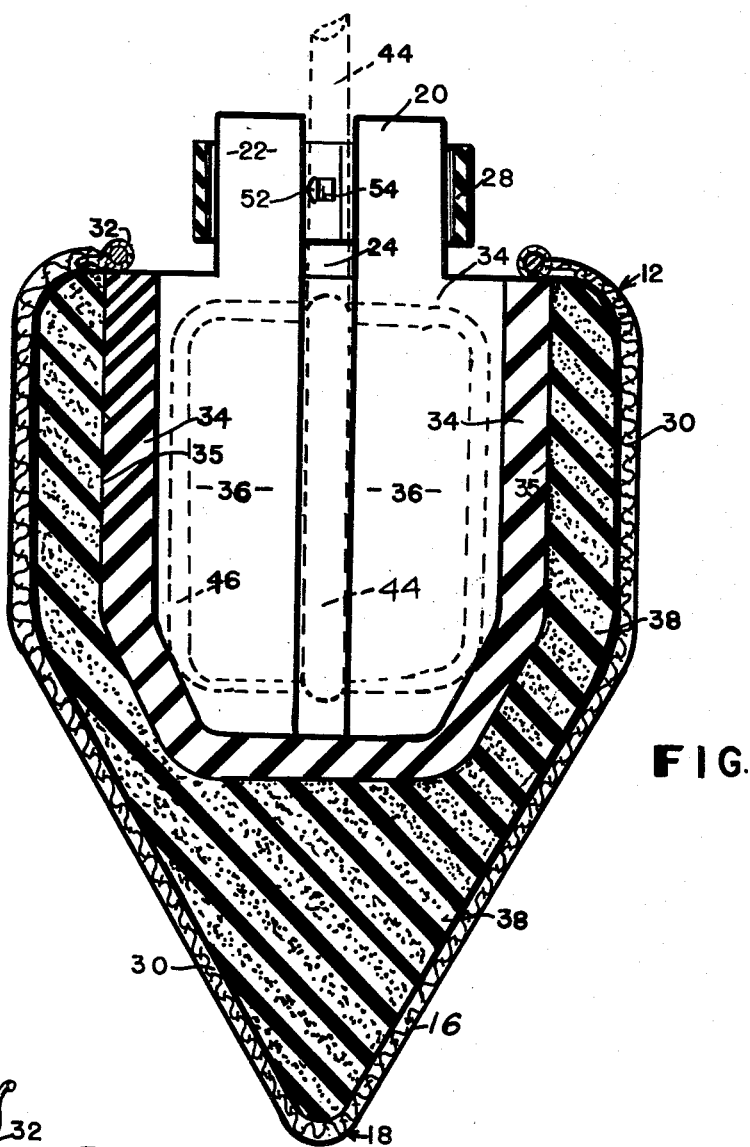
Fig. 5 is a cross-sectional view taken vertically, centrally of the device in Fig. 1 substantially along the lines 5—5 thereof.

As may be seen in Figs. 1 to 4, inclusive, the polishing device 10 presents an overall body 12 of upper cylindrical shape at 14 tapering at the lower portion thereof into a cone-shaped bottom 16 with tip 18. The upper portion of the body 12 has a smaller cylindrical neck-like protrusion member 20 divided into quarters 22 by an intersection cross-slots 24 extending down into the internal part of the body 12. By this construction (as will be hereinafter described in more detail) the device 10 can be attached onto the beaters on the shaft of a conventional mixer 26 and held firmly in place by a resilient band member 28. The outside of the body 12 has a polishing cover 30 thereon which may be of any suitable polish cloth material preferably removable through the use of a draw string 32 for replacement and washing.

Proceeding into more detail found in the Fig. 5, it is seen that the body 12 is composed of a center core member 34 with the neck attaching member 20 formed on the upper end thereof and the slots 24 forming deep cavities or a socket therein creating sets of opposed inner wall faces 36. Completely surrounding the center core member 34 and fixed thereto, as by glueing, all along the juncture 35 is the outer, softer buffing member 38 of foam rubber or similar material of plastic or the like; it being the member which gives the outer contour to the entire body 12. The bottom conical-shaped portion of member 38 making bottom 16 and tip 18 is entirely of the resilient foam material covered with the cover 30 and will therefore distort very easily, bend, and compress to fit into the inside of goblets, bowls, serving spoons and the like without any possibility of damage.

In placing the attachment on the beaters of a conventional mixer such as the one 26 in Fig. 2 usually on a stand 40 and which has the beater casing 42 with rotatable shaft 44 operated by a motor (not shown) within the casing 42 on which shaft 44 are rigid beaters 46, there usually being four parabola-like and 90 degrees apart. Therefore each leg 48 of the slots 24 will receive one of the beaters. The beaters are left in their usual position on the machine and the legs 48 of slots 24 are lined up with a respective beater and the entire attachment is forced onto the entire beater with the harder core 34 receiving all the beaters in a respective slot and confining same between the walls 36. Neck 20 will encompass the beater shaft 44 in this position, and a flexible band member 28 of rubber or the like with grommets and holes 52 and an attaching hook 54 is slipped around the neck and the hook 54 hooked into an appropriate grommeted hole to securely tighten the neck about the shaft 44.

Figure 6:
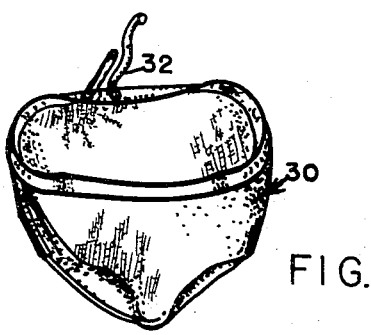
Fig. 6 is a pictorial view of the cover for the device in partly collapsed condition.

As mentioned heretofore, cover 30 is removable from the buffing member 38 and will collapse into a folded condition, as shown partially done in Fig. 6. With this arrangement, covers may be washed when desired, or repaired, or replaced by a similar one if worn out. There can be several types of covers, that is, one could be of very porous material for applying silver polish and the like while another could be of soft, nappy fabric or lambs-wool for polishing and the many covers could readily be interchanged. These hollow cover members 30 are readily folded and stored.

Most mixers are like the one shown in Fig. 2 wherein the casing 42 is removable from its stand 40 and portable within the limits of the electric wire plugged into the wall. Therefore, with the invention body 12 in place thereon the mixer casing may be removed from the base 40 and the polisher used in motion against objects and items which will not conveniently fit under the machine mixer while on its base. With this arrangement, large serving trays, door knockers, brass nameplates and the like are readily cleaned at their normal place.

The present invention is uniquely arranged so that many sizes of beaters 46 will be securely held within the core 34 between faces 36 in slots 24. It is readily noted by considering Fig. 5 that it will not matter materially whether the beaters 46 are longer or shorter than the one shown since they all are within a few inches in size one way or the other and the resilient core 34 (which is somewhat harder than the outside buffing member 38 but still with enough flexibility to permit a beater to be forced between the walls 36 of slots 24) securely confines whatever beaters are placed therein. With band 28 in place, there is no appreciable wobble of the device on the beaters 46; and no unusual forces or torque on the beaters.

It is pointed out that even though the present invention is discussed in conjunction with mixers with open, curved beaters, other mixers will take the present invention and it may be applied to so-called blenders, such as the "Waring," which have flat agitators. Therefore, while I have shown and described a preferred form of this invention in detail and very much in proportion, it is to be understood that this is by way of illustration only and does not extend to the scope of my invention, reference being made to the appended claims wherein the extent of this invention is defined according to proper construction thereof.

I claim:

1. In a polishing attachment for positioning on and removal from the elongated, laterally projecting beaters of a conventional kitchen mixer and the like, a polishing body having a relatively, resilient core with a plurality of slots therein for receiving and confining the beaters, a smooth outer polishing portion fixed in contact with and to remain on the inner core and presenting a resilient polishing surface, and means for holding said attachment firmly on said beaters.

2. In a polishing attachment for positioning on and removal from the beaters carried by a shaft of a conventional kitchen mixer, a relatively hard, resilient core member having a depression therein for receiving and confining the beaters, a softer outer polishing member fixed in contact with and to remain on the outer periphery of the attachment for movement with the inner core member to present a resilient polishing surface, said core member and said outer polishing member together making up a polishing body adapted to be supported on the mixer beater and with the mixer shaft protruding upwardly therefrom, an attaching member protruding from the upper portion of said body and having portions thereof spaced about said mixer shaft, and means for securing said attaching member portions about said shaft.

3. The device in claim 1 having a removable cover thereon.

4. The device in claim 2 having a removable cover thereon.

5. In a polishing attachment for positioning on and removal from the beater carried by the shaft of a conventional kitchen mixer and the like, a relatively hard, resilient core member having downwardly recessed core depressions therein for receiving and confining the mixer beaters therein, a softer outer polishing member fixed in contact with and to remain on the inner core member and presenting a resilient polishing surface, said core member and said outer polishing member together making up a polishing body adapted to be supported on the mixer beater with the mixer shaft protruding upwardly therefrom, an attaching member protruding from the upper portion of said body and having slots therein forming portions thereof spaced about said mixer shaft, and a securing member adapted to encompass at least part of the attaching member with means for locking and securing same about said shaft.

6. In a polishing attachment for positioning on and removal from the beaters carried by the shaft of a conventional kitchen mixer, a relatively hard, flexible core member having a pair of intersecting downwardly recessed slots therein for receiving and confining the mixer beaters, a softer outer polishing member together with said core member making up a polishing body with said outer member presenting a resilient polishing surface, said polishing body adapted to be supported on the mixer beaters with the mixer shaft protruding upwardly therefrom, a neck attaching member protruding upwardly from the upper portion of said core about the center and having slots therein corresponding to and in alignment with said core slots forming portions thereof spaced about said mixer shaft, and a securing member detachably encompassing said neck member for selectively securing same under pressure about said shaft.

7. In a polishing attachment for positioning on and removal from the laterally projecting, elongated heaters of a conventional kitchen mixer and the like, a polishing body having a relatively, resilient center core portion with a plurality of slots therein for receiving and confining the beaters, said slots intersecting each other and each radiating downwardly from substantially the center of said polishing body and terminating at a point between the center of said polishing body and the peripheral edge thereof, said slots extending downwardly into said body a distance sufficient to receive a portion of the length of said beaters therein with a respective beater in each respective slot, and said slots thereby forming resilient depressions radiating from an open center, an outside smooth polishing portion fixed with respect to and encompassing said center core and forming a generally cylindrical outer periphery, said outside polishing member tapering from the bottom of said cylindrical portion to form a generally cone-shaped lower tip portion, thereby forming the tip of a polishing cone which may be bent while spinning to fit into openings, cracks, cup-like portions, and the like, and means for holding the said beaters removably on said body in said slots.

8. In a polishing attachment for positioning on and removal from the beaters carried by the shaft of a conventional kitchen mixer, a relatively hard, flexible core member having a pair of substantially perpendicular intersecting slots recessed downwardly therein for receiving and confining the mixer beaters, a neck attaching member located at and extending from about the longitudinal center of said core and having said slots extending in alignment upwardly therethrough defining four portions of said neck with spaces therebetween and a center opening therein, a softer outer polishing member completely encompassing said inner core about the sides thereof, said outer polishing member being of substantially cylindrical outside shape and tapering at the bottom thereof in a conical shape with the lowermost portion thereof solidly of flexible material permitting said lowermost portion limited movement under external pressure, said core and said polishing member together forming a polishing body with the slots leading from the upper neck thereof, whereby a beater or agitator end of a mixer shaft may be inserted to completely confine the end of said shaft in said core with said shaft surrounded by said neck portions and extending upwardly therefrom for attachment to a mixer, and a pressure band member selectively engageable about said neck to press said neck portion together about the mixer beater shaft thereby securely locking it in place.

References Cited in the file of this patent
UNITED STATES PATENTS

| | | |
|---|---|---|
| 987,959 | Coney | Mar. 28, 1911 |
| 1,673,913 | Jurgensen | June 19, 1928 |
| 1,837,938 | Young | Dec. 22, 1931 |
| 2,227,588 | Kemp | Jan. 7, 1941 |
| 2,311,879 | Schultz | Feb. 23, 1943 |
| 2,496,972 | Wolfe | Feb. 7, 1950 |